(12) United States Patent
Dong

(10) Patent No.: US 11,080,338 B2
(45) Date of Patent: Aug. 3, 2021

(54) INFORMATION PROCESSING APPARATUS, INFORMATION PROCESSING METHOD, AND PROGRAM

(71) Applicant: NEC Corporation, Tokyo (JP)

(72) Inventor: Tingting Dong, Tokyo (JP)

(73) Assignee: NEC CORPORATION, Tokyo (JP)

( * ) Notice: Subject to any disclaimer, the term of this patent is extended or adjusted under 35 U.S.C. 154(b) by 45 days.

(21) Appl. No.: 16/477,553

(22) PCT Filed: Jan. 13, 2017

(86) PCT No.: PCT/JP2017/000962
§ 371 (c)(1),
(2) Date: Jul. 12, 2019

(87) PCT Pub. No.: WO2018/131132
PCT Pub. Date: Jul. 19, 2018

(65) Prior Publication Data
US 2019/0370287 A1 Dec. 5, 2019

(51) Int. Cl.
*G06F 17/00* (2019.01)
*G06F 16/908* (2019.01)
*G06F 16/903* (2019.01)
*G06F 16/9032* (2019.01)
*G06K 9/62* (2006.01)

(52) U.S. Cl.
CPC ...... *G06F 16/908* (2019.01); *G06F 16/90328* (2019.01); *G06F 16/90335* (2019.01); *G06K 9/6215* (2013.01); *G06K 9/6218* (2013.01)

(58) Field of Classification Search
CPC ............ G06F 16/908; G06F 16/90335; G06F 16/90328; G06K 9/6215; G06K 9/6218; G06K 9/6212

USPC .......................................................... 715/700
See application file for complete search history.

(56) References Cited

U.S. PATENT DOCUMENTS 8,204,889 B2   6/2012   Liu et al.
8,306,281 B2   11/2012   Matsubara et al.
(Continued)

FOREIGN PATENT DOCUMENTS

JP   2004259061 A   9/2004
JP   2006139382 A   6/2006
(Continued)

OTHER PUBLICATIONS van Leuken, Reinier H., et al., "Visual Diversification of Image Search Results", Proceedings of the 18th International Conference on World Wide Web (WWW), p. 341-350, 2009.
(Continued)

*Primary Examiner* — Hassan Mrabi
(74) *Attorney, Agent, or Firm* — Sughrue Mion, PLLC

(57) ABSTRACT

An information processing apparatus includes a search processing part and a result presentation part. The search processing part selects, based on a first feature(s) specified by a search condition(s) from a user and a second feature(s) not specified by the search condition(s) among a plurality of features extracted from a plurality of objects, a representative result object(s) that matches the search condition(s) from the plurality of objects. The result presentation part presents at least the representative result object(s) to the user.

11 Claims, 8 Drawing Sheets

(a)

| Sim(face) | $face_Q$ | $face_2$ | $face_3$ | $face_4$ |
|---|---|---|---|---|
| $face_1$ | 0.95 | 0.92 | 0.81 | 0.58 |
| $face_2$ | 0.9 | | 0.82 | 0.56 |
| $face_3$ | 0.8 | | | 0.5 |
| $face_4$ | 0.6 | | | |

(b)

| Sim(color) | $color_Q$ | $color_2$ | $color_3$ | $color_4$ |
|---|---|---|---|---|
| $color_1$ | 0.98 | 0.98 | 0.1 | 0.89 |
| $color_2$ | 0.96 | | 0.1 | 0.9 |
| $color_3$ | 0.1 | | | 0.1 |
| $color_4$ | 0.9 | | | |

(56) References Cited

U.S. PATENT DOCUMENTS

| | | | |
|---|---|---|---|
| 8,352,494 B1* | 1/2013 | Badoiu | G06F 16/5838 |
| | | | 707/772 |
| 8,620,037 B2 | 12/2013 | Matsubara et al. | |
| 9,009,147 B2* | 4/2015 | He | G06F 16/9024 |
| | | | 707/728 |
| 9,129,008 B1* | 9/2015 | Kuznetsov | G06F 16/24578 |
| 9,495,425 B1* | 11/2016 | Kuznetsov | G06F 16/24578 |
| 9,659,214 B1* | 5/2017 | Kennedy | G06K 9/00409 |
| 9,875,244 B1* | 1/2018 | Kuznetsov | G06F 16/435 |
| 10,191,905 B2* | 1/2019 | Kuznetsov | G06F 16/313 |
| 10,475,100 B1* | 11/2019 | Herz | G06Q 30/0629 |
| 10,698,942 B2* | 6/2020 | Kuznetsov | G06F 16/24578 |
| 2009/0060294 A1* | 3/2009 | Matsubara | G06K 9/00496 |
| | | | 382/118 |
| 2011/0225172 A1* | 9/2011 | Liu | G06F 16/58 |
| | | | 707/748 |
| 2012/0254076 A1* | 10/2012 | Yang | G06F 16/5866 |
| | | | 706/12 |
| 2012/0294531 A1 | 11/2012 | Matsubara et al. | |
| 2014/0236941 A1* | 8/2014 | Johns | G06F 16/9566 |
| | | | 707/730 |
| 2015/0302886 A1* | 10/2015 | Brock | H04L 63/0263 |
| | | | 726/32 |
| 2017/0235848 A1* | 8/2017 | Van Dusen | G06F 16/904 |
| | | | 705/12 |
| 2017/0249367 A1* | 8/2017 | Bergsma | G06F 16/54 |
| 2017/0372127 A1* | 12/2017 | Meany | G06F 16/5838 |
| 2018/0089307 A1* | 3/2018 | Cohen | G06F 16/93 |
| 2019/0012716 A1* | 1/2019 | Murakami | G06F 16/532 |
| 2019/0155832 A1* | 5/2019 | Kuznetsov | G06F 16/438 |
| 2020/0349240 A1* | 11/2020 | Yin | H04W 88/02 |

FOREIGN PATENT DOCUMENTS

| | | |
|---|---|---|
| JP | 2009027393 A | 2/2009 |
| JP | 2009110460 A | 5/2009 |
| JP | 2011192273 A | 9/2011 |
| JP | 2013109606 A | 6/2013 |
| JP | 2013114507 A | 6/2013 |

OTHER PUBLICATIONS

Capannini, G., et al., "Efficient Diversification of Web Search Results", Proceedings of the 37th International Conference on Very Large Data Bases (VLDB), vol. 4, No. 7, p. 451-459, 2011.

Drosou, M., et al., "DisC Diversity: Result Diversification based on Dissimilarity and Coverage", Proceedings of the 39th International Conference on Very Large Data Bases (VLDB), vol. 6, No. 1, pp. 13-24, 2013.

International Search Report, dated Mar. 21, 2017 from the International Bureau in counterpart International application No. PCT/JP2017/000962.

* cited by examiner

| Sim(face) | $face_Q$ | $face_2$ | $face_3$ | $face_4$ |
|---|---|---|---|---|
| $face_1$ | 0.95 | 0.92 | 0.81 | 0.58 |
| $face_2$ | 0.9 | | 0.82 | 0.56 |
| $face_3$ | 0.8 | | | 0.5 |
| $face_4$ | 0.6 | | | |

(b)

| Sim(color) | $color_Q$ | $color_2$ | $color_3$ | $color_4$ |
|---|---|---|---|---|
| $color_1$ | 0.98 | 0.98 | 0.1 | 0.89 |
| $color_2$ | 0.96 | | 0.1 | 0.9 |
| $color_3$ | 0.1 | | | 0.1 |
| $color_4$ | 0.9 | | | |

INFORMATION PROCESSING APPARATUS, INFORMATION PROCESSING METHOD, AND PROGRAM

This application is a National Stage Entry of PCT/JP2017/000962 filed on Jan. 13, 2017, the contents of all of which are incorporated herein by reference, in their entirety.

FIELD

The present invention relates to an information processing apparatus, an information processing method, and a program. In particular, it relates to an information processing apparatus, an information processing method, and a program that perform data search.

BACKGROUND

Along with advancement in information acquisition means and storage technology, information that can be used by users has increased and diversified. For example, users can easily acquire and utilize various data such as document and image data on the Internet, video data captured by security cameras, and location information acquired from Global Positioning System (GPS) sensors.

In addition, from these data, a plurality of kinds of information (a plurality of kinds of features or feature amounts) can be used or extracted. For example, a plurality of kinds of information can be used from image data to which document information as metadata, location information as imaging locations, time information as imaging times, etc. is attached. Specifically, users can extract not only location information, etc. directly from metadata but also pixel information such as red, green, and blue (RGB) information from image data. For example, the extracted information can be used for face image recognition (attribute information such as faces can also be recognized).

Thus, along with the increase in the information amount, a function of managing the information (a search function in particular) has become very important. For this reason, various search methods and apparatuses directed to multimedia data in which various kinds of information coexist have been proposed. For example, PTL 1 discloses a technique relating to video monitoring for intruder detection, etc. In this technique, different features of a single person are acquired from an image of video data, a plurality of features of the person are specified by user specification or a human tracking method, and an image that matches the specified conditions is retrieved.

To efficiently extract information desired by a user from large-scale data including a plurality of kinds of information, presenting result information to the user in a plain and simple manner is also important. Namely, when a search request from a user is processed, only arranging results that match or are similar to a search condition(s) is not sufficient. It is desirable to reduce the time needed by the user to check the search results or acquire desired information from the search results by organizing duplicate or similar results and presenting a representative result(s).

PTL 2 discloses a technique in which display pattern candidates are set, multimedia data obtained as search results based on a search condition(s) is classified based on a display pattern selected by a user, and the search results are presented to the user in accordance with a relationship among the classified groups.

PTL 3 discloses a technique of grouping images including metadata such as programs based on an inter-document distance between a search string and a sentence included in the metadata. In addition, in this technique, representative images are selected based on statistical dispersion of image features from the individual groups, and representative images associated with metadata close distance-wise are selected and displayed as candidates.

PTL 4 discloses a technique enabling a user to promptly grasp the entire contents of a group of images in an electronic album, etc. In this technique, a representative image(s) that represents the contents of all the images is displayed based on document features or visual features of the individual images.

PTL 5 discloses a technique that determines candidate information to be presented next time based on an adaptability calculated based on a similarity between information selected via input means and information accumulated in storage means.

There is also a method in which extraction of features is performed on search result candidates, clustering is performed, and representative results are selected from the individual clusters (see NPL 1). There is also a method of selecting representative results in accordance with a search result diversification method from data including a single kind of information such as document data or location data (see NPLs 2 and 3).

PTL 1: Japanese Patent Kokai Publication No. JP-2009-27393A

PTL 2: Japanese Patent Kokai Publication No. JP-2006-139382A

PTL 3: Japanese Patent Kokai Publication No. JP-2013-114507A

PTL 4: Japanese Patent Kokai Publication No. JP-2011-192273A

PTL 5: Japanese Patent Kokai Publication No. JP-2004-259061A

NPL 1: Reinier H. van Leuken, Lluis Garcia, Ximena Olivares and Roelof van Zwol, "Visual Diversification of Image Search Results", Proceedings of the 18th International Conference on World Wide Web (WWW), pp. 341-350, 2009

NPL 2: Gabriele Capannini, Franco Maria Nardini, Raffaele Perego and Fabrizio Silvestri, "Efficient Diversification of Web Search Results", Proceedings of the 37th International Conference on Very Large Data Bases (VLDB), Vol. 4, No. 7, pp. 451-459, 2011

NPL 3: Marina Drosou and Evaggelia Pitoura, "DisC Diversity: Result Diversification based on Dissimilarity and Coverage", Proceedings of the 39th International Conference on Very Large Data Bases (VLDB), Vol. 6, No. 1, pp. 13-24, 2013

SUMMARY

The disclosure of each of the above literatures is incorporated herein by reference thereto. The following analysis has been made by the present inventor.

In accordance with the technique in PTL 1, data including a plurality of kinds of information (a plurality of kinds of features) can be handled. However, in this technique, since a list of search results is displayed based on compatibility with a search condition(s), duplicate or similar search results could be displayed. Thus, when a user grasps these search results, the user needs to find desired information by organizing the difference among the duplicate or similar results in his/her head and checking a large number of results one by one. Thus, much burden (labor and time) is imposed on the user.

In addition, a problem arises when the user does not grasp target data. Specifically, when the user sets an inappropriate or erroneous search condition, few or no results could be obtained. In addition, there are cases in which a plurality of kinds of information or features are extracted from multimedia data and search processing is performed thereon. In such cases, in accordance with the above technique, for example, if the accuracy of the extraction method is low or if there is missing data, the quality of the extracted features could be low. In these cases, too, search results desired by the user could not be obtained.

For example, consider a case in which features such as the face, a clothes color, and the location of a person are extracted from moving image data. In this case, the user performs searching by specifying conditions about the face, the clothes colors, and the location. If the face of the person that matches the specified clothes color and location cannot be acquired or extracted successfully, a result that matches the conditions specified by the user cannot be obtained. In these cases, the user needs to adjust the search conditions many times. Such readjustment of the search conditions is also much burden on the user. For example, the technique in PTL 5 also has the above problem. In PTL 5, a case in which the user cannot find requested information in the candidate information presented by an information search apparatus is equivalent to a case in which the search request from the user does not substantially exist. Thus, the user needs to adjust a search condition(s) many times.

The techniques in PTLs 2 and 3 are directed to data including a single kind of information. In addition, since the techniques are based on a property unique to the kind of information, the technique cannot be applied to data including another kind of information and data including a plurality of kinds of information. Specifically, in PTL 2, since the search results are classified based on the display pattern selected by the user, the technique cannot be applied to a case in which no display pattern candidates are set. In PTL 3, since an image is selected based on a similarity between an inputted search string and a sentence included in the metadata of an image, the technique cannot be applied to a case in which there is no document as a search condition or target data does not include document information. In addition, in PTL 4, document information and visual information are taken into consideration. The document information is used as information for ensuring diversification, and the visual information is used as information for selecting a representative image(s) based on frequency therein. Since the axis of classification and selection is determined in advance depending on the kind of information, when the diversification is low in the document information and the frequency is about the same in the visual information, effective results cannot be presented to the user.

In addition, the clustering method has two problems. First, since the calculation amount needed in the search processing is large, it is difficult to handle search requests. Second, it is difficult to perform adjustment since selection of a representative result(s) depends on a parameter setting(s) in the clustering.

It is an object of the present invention to provide an information processing apparatus, an information processing method, and a program that can efficiently search objects including various kinds of information for information desired by a user and provide the retrieved information.

According to a first aspect of the present invention, there is provided an information processing apparatus, including: a search processing part that selects a representative result object(s), from a plurality of objects, that matches a search condition(s) from a user, based on a first feature(s) specified by the search condition(s) and a second feature(s) not specified by the search condition(s) among a plurality of features extracted from the plurality of objects; and a result presentation part that presents at least the representative result object(s) to the user.

According to a second aspect of the present invention, there is provided an information processing apparatus, including: a representation power and independence power calculation section that calculates a representation power indicating an importance of an individual feature extracted from an individual one of a plurality of objects and an independence power indicating that a certain feature cannot be estimated from another feature based on a correlation between the features; and a search result diversification section that calculates a similarity score of an individual one of the plurality of objects based on a search condition(s) from a user, the similarity score being indicating how much the object matches the search condition(s) and a diversity score indicating a difference from another (other) object(s) based on the representation power, the independence power, and the similarity score of the individual object; wherein the search result diversification section selects a representative result(s) from the plurality of objects based on the diversity scores.

According to a third aspect of the present invention, there is provided an information processing method, including steps of:

selecting a representative result object(s), from a plurality of objects, that matches a search condition(s) from a user, based on a first feature(s) specified by the search condition(s) and a second feature(s) not specified by the search condition(s) among a plurality of features extracted from the plurality of objects; and presenting at least the representative result object(s) to the user.

According to a fourth aspect of the present invention, there is provided a program, causing a computer to perform processing for: selecting a representative result object(s), from a plurality of objects, that matches a search condition(s) from a user, based on a first feature(s) specified by the search condition(s) and a second feature(s) not specified by the search condition(s) among a plurality of features extracted from the plurality of objects; and presenting at least the representative result object(s) to the user.

This program can be recorded in a computer-readable storage medium. The storage medium may be a non-transient storage medium such as a semiconductor memory, a hard disk, a magnetic storage medium, or an optical storage medium. The present invention can be embodied as a computer program product.

According to the individual aspects of the present invention, there are provided an information processing apparatus, an information processing method, and a program that can efficiently search objects including various kinds of information for information desired by a user and provide the retrieved information.

BRIEF DESCRIPTION OF DRAWINGS

FIG. 6 illustrates a specific example according to the first exemplary embodiment.

PREFERRED MODES

Figure 1:
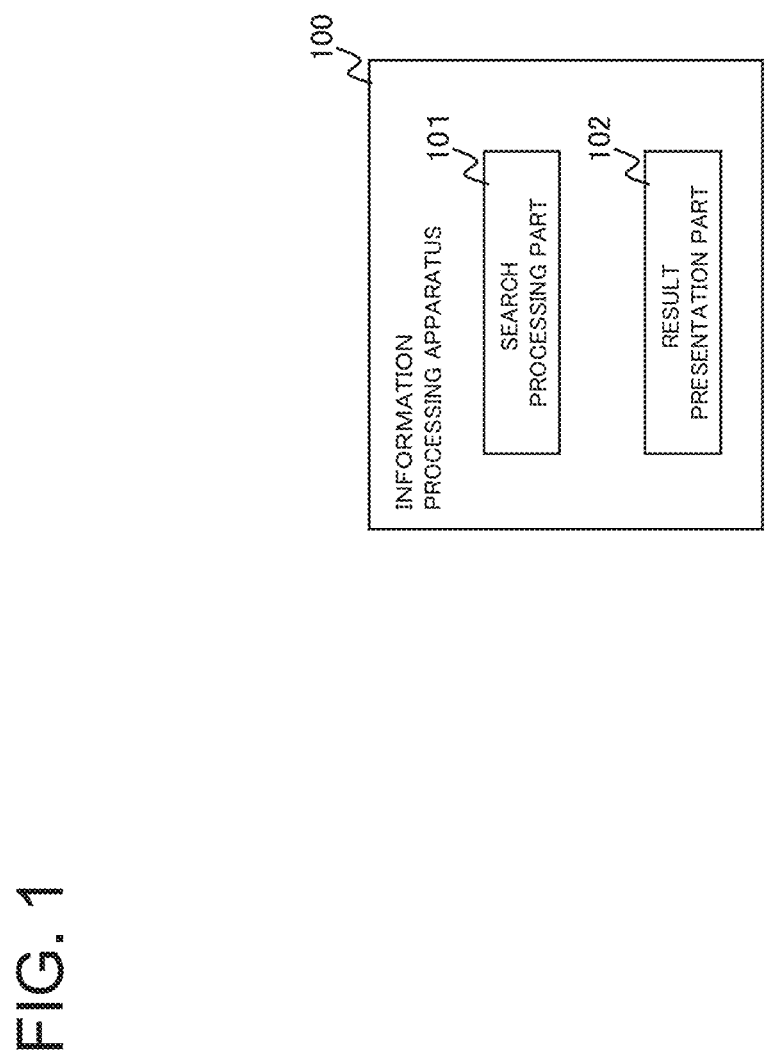
FIG. 1 illustrates an outline of an exemplary embodiment.

First, an outline of an exemplary embodiment will be described. Reference characters in the following outline denote various elements for the sake of convenience and are used as examples to facilitate understanding of the present invention. Namely, the description of the outline is not intended to indicate any limitations.

As described above, there is a demand for an apparatus (system) that resolves the increase in labor and time needed by the user to check a large number of search results one by one and find desired information. In addition, there is a demand for an apparatus that reduces the labor caused, for example, when the user sets an inappropriate or erroneous search condition and obtains few or no search results.

An information processing apparatus 100 according to an exemplary embodiment includes a search processing part 101 and a result presentation part 102. The search processing part 101 selects, based on a first feature(s) specified by a search condition(s) from a user and a second feature(s) not specified by the search condition(s), a representative result object(s) that matches the search condition(s) from a plurality of objects. The result presentation part 102 presents at least the representative result object(s) to the user.

The information processing apparatus 100 handles data such as image data as processing targets (objects). For example, the information processing apparatus 100 handles multimedia data including information about faces (face images) and clothes colors. The information processing apparatus 100 receives a content(s) that the user wishes to find as "a search condition(s)". For example, the user enters, as "a search condition", an image such as a face image or an image of a person (an image of a person wearing clothes) that the user wishes to find, a clothes color that the user wishes to find, or the number of objects that the user wishes to acquire as the search results. By using not only a feature(s) specified by a search condition(s) but also a feature(s) not specified among a plurality of features, the information processing apparatus 100 selects an object(s) that matches the search condition(s) as a representative object(s) (a result object(s)) presented to the user.

As a result, diverse representative results can be selected from the objects (for example, multimedia data) including the plurality of kinds of information in response to the search condition(s) from the user, and a duplicate or similar search result(s) can be collectively depended to the representative result(s). Namely, the representative result(s) and the depending result(s) can be presented to the user in a plain and simple manner. In addition, the labor of the user to adjust the search condition(s) can be reduced by performing search processing by using not only the search condition(s) specified by the user but also various kinds of information (information not specified by the search condition(s)) that exists in the objects. Thus, the time needed by the user to check the search results or acquire desired information from the search results can be reduced. In this way, the information processing apparatus 100 realizes the functions of diversification and summarization of search results on multimedia data, etc. including various kinds of information.

Hereinafter, a specific exemplary embodiment(s) will be described in more detail with reference to drawings. In the individual exemplary embodiment(s), like elements are denoted by like reference characters, and description thereof will be omitted. An individual connection line between blocks in an individual drawing signifies both one-way and two-way directions. An individual arrow schematically illustrates the principal flow of a signal (data) and does not exclude bidirectionality.

First Exemplary Embodiment

A first exemplary embodiment will be described in detail with reference to drawings.

Figure 2:
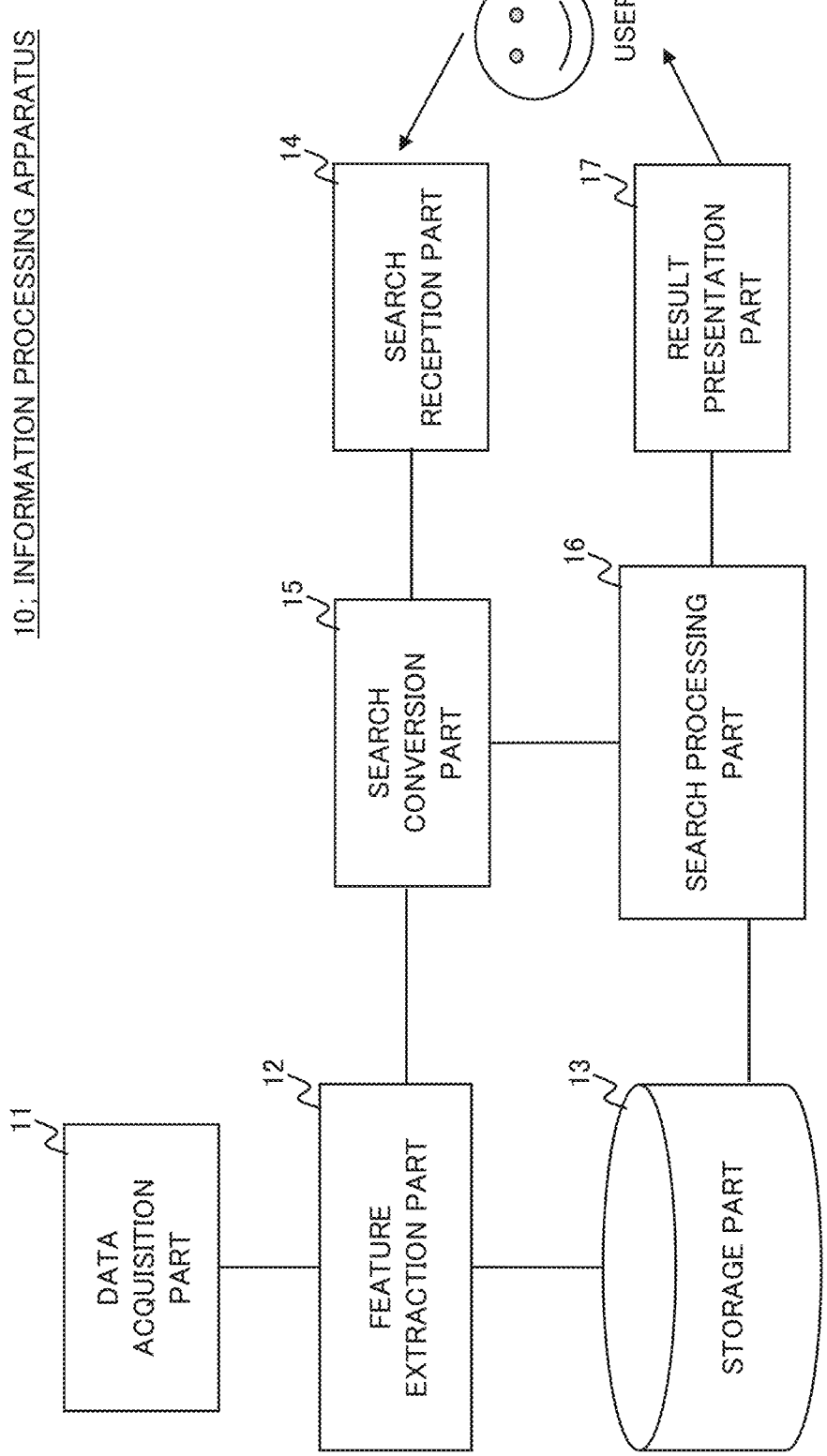
FIG. 2 illustrates an example of a processing configuration of an information processing apparatus according to a first exemplary embodiment.

FIG. 2 illustrates an example of a processing configuration of an information processing apparatus 10 according to a first exemplary embodiment. As illustrated in FIG. 2, the information processing apparatus 10 includes a data acquisition part 11, a feature extraction part 12, a storage part 13, a search reception part 14, a search conversion part 15, a search processing part 16, and a result presentation part 17.

The data acquisition part 11 is means for acquiring objects (for example, multimedia data such as image data or video data) including a plurality of kinds of information such as text, audio, time, location, pixel, and attribute information.

The feature extraction part 12 is means for extracting a plurality of features from a plurality of objects (a search target and objects to be searched; for example, multimedia data). Specifically, the feature extraction part 12 uses, for example, various kinds of information extraction methods or recognition engines on the objects acquired by the information processing apparatus 10 and calculates features. For example, the feature extraction part 12 calculates coordinates as location information from an imaging location of an individual image in image data and extracts features of faces by using a face recognition engine.

The storage part 13 is means for holding the extracted features.

The search reception part 14 is means for receiving a search request from a user. Example information, a specified condition, a pattern, or the like may be used as a search condition. For example, the user enters a sample image or audio, specifies an imaging location and imaging time, enters an image of a face and specifies a threshold for the similarity to the face, or specifies the number of times a specified document appears.

The search conversion part 15 is means for converting a received search request into a feature(s) and a search condition(s) about the feature(s). For example, when receiving a face image from the user as a search target, the search conversion part 15 extracts the face from the acquired image and calculates the corresponding feature. Alternatively, the search conversion part 15 may be omitted, and the search condition(s) may be directly inputted from the user.

The search processing part 16 is means for processing the converted search request and calculating a search result(s). More specifically, the search processing part 16 selects, based on a first feature(s) specified by the search condition(s) from the user and a second feature(s) not specified by the search condition(s), a representative result object(s) that matches the search condition(s) from a plurality of objects. For example, even when the user enters only information about a "face" to the information processing apparatus 10, the search processing part 16 selects a representative result(s) suitably presented to the user (a representative result(s) that matches the request from the user) in view of information other than the face information (for example, information about a clothes color).

The result presentation part 17 is means for presenting at least the representative result(s) (result object(s)) to the user.

Search Processing Part and Result Presentation Part

Next, the search processing part 16 and the result presentation part according to the first exemplary embodiment will be described in detail.

Figure 3:
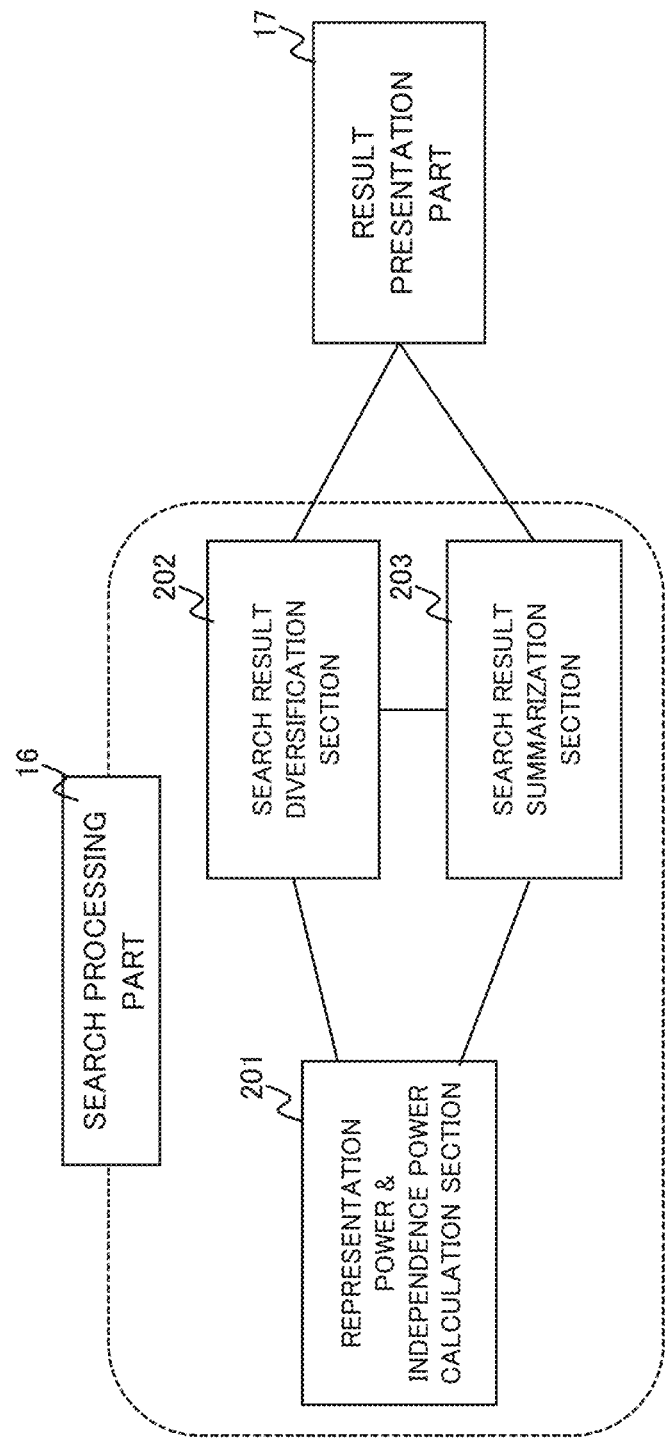
FIG. 3 illustrates an example of an internal configuration of a search processing part.

FIG. 3 illustrates an example of an internal configuration of the search processing part 16. As illustrated in FIG. 3, the search processing part 16 includes submodules including a representation power and independence power calculation section 201, a search result diversification section 202, and a search result summarization section 203.

The representation power and independence power calculation section 201 is means for calculating the representation power and the independence power of an individual feature.

The search result diversification section 202 is means for detecting a representative search result(s) and diversifying a search result(s).

The search result summarization section 203 is means for summarizing a search result(s). The search result summarization section 203 calculates a depending object(s) depended to a representative result(s).

The result presentation part 17 presents the diverse representative result(s) and the summarized depending object(s) to the user (displays the representative result(s) and the depending object(s)). The representative result(s), the depending object(s), etc. will be described in detail below.

The representation power of a feature is an index indicating importance of the feature. In other words, the representation power of a feature indicates importance of the feature when the corresponding object constituting data is determined from the data. The representation power is calculated for an individual one of a plurality of features extracted from objects. In addition, the representation power of a feature can be considered as "the possibility that the corresponding object can be expressed by the feature". For example, there is a fact that there are more people at similar ages than people with similar faces in the world. From this, it is fair to say that it is easier to distinguish people by their faces rather than by their ages. In other words, people are more likely to be expressed by their faces rather than by their ages. Namely, it is fair to say that face has greater representation power than age.

Thus, when searching image data for an image relating to a specified face and age, it is better to give a higher priority to face whose representation power is higher than that of age and present images having faces similar to the specified face as upper search results to the user. With these images presented, the user is more likely to find a desired image from the search results and can find necessary information more quickly. In view of the above situation, the representation power and independence power calculation section 201 calculates the representation power of an individual feature. Specific calculation examples of the representation power will be described below.

The independence power of an individual feature is an index indicating that a certain feature cannot be estimated from another feature based on a correlation between the features. The independence power of a feature can be considered as "the possibility that a certain feature is not correlated with another feature". For example, there is a fact that, while it is more likely that people with similar faces are at similar ages and have a similar gender, people at similar ages and have the same gender do not always have similar faces. From this fact, it is fair to say that the age and the gender can be estimated from a face or that it is more likely that the age and the gender are correlated with a face. Namely, the independence powers of the age and the gender are lower than that of the face. In contrast, the independence power of the face is higher than those of the age and the gender. Similar faces have low independence powers therebetween.

When searching image data for an image relating to a person at a specified age and with a specified gender, it is better to present images having different faces at similar ages and with the same gender as the search results. With these images presented, the user is more likely to find a desired image from the search results and can find necessary information more quickly. In addition, since the individual features (for example, age, gender, and face) of the images that are duplicate of or similar to the images obtained as the search results have low independence powers with respect to the individual features of the existing result images, these images do not have a high priority to be used as the representative results.

In view of the above situation, the representation power and independence power calculation section 201 calculates the independence power of an individual feature. For example, while described in detail below, the independence power of a feature B with respect to a feature A is calculated by the ratio of the amount of the images whose similarity to the feature B is equal to or less than a threshold divided by the amount of the images whose similarity to the feature A is equal to or more than a threshold.

The above feature representation power and independence power are not simply determined by common sense but vary depending on the target data group. For example, in the case of a data group of images of people having similar faces, for example, their ages and genders have higher representation powers and independence powers than those of their faces.

Next, regarding the feature of an individual image, the search result diversification section 202 calculates a similarity (a feature similarity score) between features based on a known similarity definition. Namely, when a plurality of kinds of features are obtained from a single object (search target data, target data to be searched), the search result diversification section 202 calculates a similarity between features of the same kind as a similarity score.

After calculating the feature similarity scores, the search result diversification section 202 calculates a similarity (an object similarity score) between objects (for example, image data). For example, the search result diversification section 202 calculates an object similarity score as a sum of the individual feature similarity scores extracted from the individual objects. Next, the search result diversification section 202 uses the similarity score(s), the representation powers, and the independence powers of the individual features to calculate a diversity score. Specific calculation examples of these features, similarity scores, and diversity scores of objects will be described below.

The information processing apparatus 10 according to the first exemplary embodiment uses hidden knowledge such as statistical information of a data group, calculates the representation power and the independence power of an individual feature, and presents to diverse representative results including information desired by the user as much as possible to the user. As a result, information search by the user is accelerated.

In an existing technique, in response to a search condition(s) corresponding to a feature(s) obtained by converting a search request from a user, a search result(s) is calculated based on a similarity score(s) indicating compatibility with the specified feature(s). In the disclosure of the present application, the information processing apparatus 10 not only considers the similarity score(s) but also the representation power(s) and the independence power(s) of the specified feature(s) and preferentially presents a result(s) (as a representative search result(s)) having a feature(s) whose similarity score, representation power, and independence power are high. As a result, a duplicate or similar result(s) is excluded, and a representative result(s) is selected.

In addition, in the disclosure of the present application, the information processing apparatus 10 also considers the representation power(s) and independence power(s) of a feature(s) not specified. In this way, a search condition(s) can flexibly be handled, and the labor needed by the user to adjust the search condition(s) can be omitted. For example, when the user sets an inappropriate or erroneous search condition, when the accuracy of the extraction method is low, or when there is missing data, the quality of an extracted feature(s) could be low. Even in such cases, by considering the representation power(s) and independence power(s) of a feature(s), which is hidden knowledge of the corresponding data group, a search condition(s) is automatically adjusted. In addition, other than this adjustment of the search condition(s) by considering the representation power(s) and the independence power(s) of a feature(s) not specified, by presenting an exploratory result(s) having the feature(s) not specified, leading to a search condition(s) is made possible. Namely, the search processing part 16 may output a feature(s), which is a second feature(s) not specified by the search condition(s) from the user and has been used for the selection of the representative result object(s), to the result presentation part 17. The result presentation part 17 may present the outputted second feature(s) to the user. For example, after taking the representation powers and the independence powers of the individual features into consideration, if the search processing part 16 has used a feature about "face" different from "clothes color" specified by the user as a search condition to select a result object(s), the result presentation part 17 may present "face" or "feature of face" to the user.

In addition, when the user has specified no feature as a search condition, the search processing part 16 may select a representative result object(s) based on all the plurality of features extracted by the feature extraction part 12. For example, even when the user has entered only image data as the search condition without specifying "face", "clothes color", etc., if features about "face" and "clothes color" can be extracted from the image data, the search processing part 16 may select a representative result object(s) by using these features.

In addition, in the disclosure of the present application, a representativeness of an object and a diversity score indicating a dissimilarity (difference) to another object is defined, based on the similarity score(s), the representation powers, and the independence powers of individual features. Next, based on the diversity scores of the individual objects, diversification and summarization of the search results are performed.

Regarding a feature similarity score, when there is a threshold about a similarity to a specified feature or about a specified feature, the similarity score can be obtained by adding the threshold as weight to the similarity. The similarity score of an object can be defined as an aggregation (for example, a sum, a maximum value, a minimum value, an average, etc.) of the individual feature similarity scores.

Regarding a feature representation power, when a rarer feature is more important, the representation power can be defined by the reciprocal of the number of objects having this feature. Regarding a feature independence power, the independence power of a feature B with respect to a feature A can be defined by the ratio of the objects that do not have the feature B among the objects having the feature A.

For example, the diversity score of an object can be defined by a summation of an aggregation of products of the similarity(ies), the representation power(s), and the independence power(s) of an individual feature(s) specified, and an aggregation of products of the representation power(s) and the independence power(s) of an individual feature(s) not specified.

In particular, in the disclosure of the present application, a representative result(s) is selected by using a feature(s) not specified and presenting a result(s) having the feature(s). Namely, information not grasped by the user is used, and a similar object(s) having a high similarity score and a diverse object(s) having a high diversity score are selected as a representative result object(s).

In addition, in the disclosure of the present application, objects having a low diversity score(s) are collected and depended and summarized to a representative result(s). Specifically, the information processing apparatus 10 generates an object(s) (a depending object(s)) depended to a representative result(s) and presents the object(s) to the user.

Description of Operation

Next, diversification and summarization of search results will be described in detail with reference to FIG. 4.

In step S01, the search processing part 16 initializes a score variable S, an object $O_s$, a candidate object group C, an object group T, and a result object group R. The score variable S, etc. initialized are variables (intermediate variables), etc. used to calculate search results.

After the initialization, the search processing part 16 sequentially performs calculation of a similar object, calculation of diverse objects, and summarization of objects. In addition, the search processing part 16 calculates k results.

The search result diversification section 202 calculates a similar object. In this calculation of a similar object, an object having the maximum similarity score with respect to a search target object (for example, image data, etc.) is calculated.

First, an object $O_i$ (i will hereinafter denote a suffix) is acquired from the storage part 13 (step S101). If an object $O_i$ is acquired (No in step S102), a similarity score $SIM_i$ with respect to a converted search condition is calculated (step S103).

With respect to the score variable S and an object $O_s$, the maximum similarity score $SIM_i$ and the corresponding object $O_s$ are held. Specifically, if the calculated similarity score SIM, is larger than the score variable S (Yes in step S104), the score variable S is updated to the similarity score $SIM_i$, and the object $O_s$ is updated to the object $O_i$ (step S105).

If the similarity score $SIM_i$ is equal to or less than the score variable S (No in step S104), the object $O_i$ is inserted and held in the candidate object group C (step S106).

The above processing is repeated until an object having the maximum similarity score $SIM_i$ is found. Namely, if the similarity scores about all the objects in the storage part 13 are calculated (Yes in step S102), the calculation of the similarity scores is ended. Alternatively, when a similar object is found, the repetition may be ended. Namely, the calculation does not need to be performed for all the objects in the storage part 13.

If the calculation of the similarity scores is ended (Yes in step S102), the calculated similar object is inserted and held in the result object group R (step S107). In addition, in this step, the score variable S and the object $O_s$ are initialized to be used for the next calculation.

In the first exemplary embodiment, while a single object having the maximum similarity score $SIM_i$ is calculated, a plurality of similar objects may be calculated and held in the result object group R. For example, a plurality of similarity scores may be defined, and a plurality of similar objects may be calculated.

The search result diversification section 202 calculates diverse objects. In the calculation of the diverse objects, an object having the maximum diversity score is calculated.

An object $O_i$ is acquired from the candidate object C group or the storage part 13 (step S201). If an object $O_i$ is acquired (No in step S202), the diversity score $DIV_i$ with respect to the object in the result object group R is calculated (step S203).

The score variable S and an object $O_s$ corresponding to the maximum diversity score are held. If the calculated diversity score $DIV_i$ is larger than the score variable S (Yes in step S204), the score variable S is updated to the diversity score $DIV_i$, and the object $O_s$ is updated to the object $O_i$ (step S205). If the diversity score $DIV_i$ is equal to or less than the score variable S (No in step S204), the object $O_i$ is inserted and held in the object group T (step S206).

The above processing is repeated until an object having the maximum diversity score $DIV_i$ is found. Namely, if the diversity scores about all the objects in the candidate object C or the storage part 13 are calculated (Yes in step S202), the calculation of the diversity scores is ended. Alternatively, when the diverse object(s) is found, the repetition may be ended. Namely, the calculation does not need to be performed for all the objects in the candidate object group C or the storage part 13.

If the calculation of the diversity score is ended (Yes in step S202), the calculated diverse object is inserted and held in the result object group R (step S207).

If the number of objects in the result object group R reaches k (Yes in step S208) and summarization of the search results is not performed, the search processing part 16 outputs the result object group R (step S02), and the processing is ended. If the number of objects in the result object group R reaches k and summarization of the search results is performed, the score variable S and the object $O_s$ are initialized, and the object summarization is performed.

If the number of objects in the result object group R has not reached k (No in step S208), the candidate object group C is updated to the object group T, and the score variable S, the object $O_s$, and the object group T are initialized (step S209). Next, the calculation of the next diverse object is performed.

The search result summarization section 203 summarizes an object(s) (generates a depending object(s) with respect to a representative result(s)). In this object summarization, the search result summarization section 203 allocates the objects that remain in the object group T or the storage part 13 to a result object having the minimum diversity score with respect to the result objects in the result object group R.

First, an object $O_i$ is acquired from the object group T or the storage part 13 (step S301).

Next, if an object $O_i$ is acquired (No in step S302), the score variable S and object $O_s$ are initialized (step S303), and a result object $R_j$ (j will hereinafter denote a suffix) in the result object group R is acquired (step S304). If, in step S301, an object $O_i$ cannot be acquired (Yes in step S302), the object summarization processing is ended.

If a result object $R_j$ is acquired (No in step S305), the diversity score $DIV_i$ with respect to the result object $R_j$ is calculated (step S306). If a result object $R_j$ cannot be acquired (Yes in step S305), the object $O_i$ is allocated to the object $O_s$ (step S307), and summarization of the next object is performed.

The score variable S and an object $O_s$ corresponding to the minimum diversity score $DIV_i$ are held. If the calculated diversity score $DIV_i$ is smaller than the score variable S (Yes in step S308), the score variable S is updated to the diversity score $DIV_i$, and the object $O_s$ is updated to the result object $R_j$ (step S309).

If the calculated diversity score $DIV_i$ is equal to or more than the score variable S (No in step S308), the next object in the result object group R is used as the calculation target.

The above processing is repeated until a result object having the minimum diversity score $DIV_i$ is found. When a result object having the minimum diversity score $DIV_i$ is found, the repetition may be ended. Namely, the calculation does not need to be performed for all the objects in the result object group R. In certain situations, all the objects remaining in the object group T or the storage part 13 do not need to be summarized.

When the object summarization is ended, the search processing part 16 outputs the result object group R to the result presentation part 17 (step S02).

As described above, the search processing part 16 calculates a similarity score indicating a similarity with respect to a search condition(s) (for example, a face or a clothes color) for an individual one of a plurality of objects (for example, search target image data and image data to be searched). Next, the search processing part 16 selects a similar object that is similar to the search target object specified by a search condition(s) from the plurality of objects based on the similarity scores (for example, the search processing part 16 selects image data similar to the search condition(s) from the image data to be searched). Next, the search processing part 16 calculates a diversity score indicating a dissimilarity of an individual object other than the similar object among the plurality of objects with respect to the similar object and selects a representative result object(s) based on the diversity scores. Namely, the search processing part 16 selects a representative result object(s) based on the diversity scores regarding the extracted features. The calculation of the diversity score of an object is performed based on the corresponding representation powers, independence powers, and similarity score(s). In addition, a depending object(s) is selected by the search processing part 16 based on the diversity scores of the other objects with respect to the representative result object(s). Namely, a depending object(s) depended to the representative result object(s) is determined from the plurality of objects.

The result presentation part 17 can present the search result in various modes. For example, the result presentation part 17 presents the representative result object(s) and the depending object(s) to the user in a manner in which the representative result object(s) and the depending object(s) are visually distinguishable. In this operation, the result presentation part 17 may display the diverse representative result(s) and the summarized depending object(s) or display only the diverse representative result(s). In the former case, it is preferable that the representative result(s) and the depending object(s) be presented in a visually comprehensible manner. For example, the result presentation part 17 may display the depending object(s) around the representative result(s) while displaying representative result(s) in a large size and the depending object(s) in a smaller size. Alternatively, the result presentation part 17 may display the representative result(s) along with information about the number of depending objects, etc. In this case, when the representative result(s) is clicked, the result presentation part 17 may display the corresponding depending object(s). Alternatively, along with the representative result(s), the result presentation part 17 may display information (related information) relating to the search result, such as a feature(s) having a high similarity score(s) or a feature(s) having a high diversity score (s).

Specific Examples

Next, operations according to the first exemplary embodiment will be described by using specific examples 1 and 2.

The present specific examples assume that the information processing apparatus 10 extracts features about faces and clothes colors from image data and that the user enters an example image and specifies thresholds about the features and k results.

Figure 5:
FIG. 5 illustrates a specific example according to the first exemplary embodiment.

FIGS. 5a to 5d are four images (images 1 to 4), which are target data (data to be searched), and FIG. 5e is an image Q, which is search input (a search target).

The information processing apparatus 10 extracts features about the faces and clothes colors by using recognition engines for faces and clothes colors from the individual images. Regarding the features about the individual images, the information processing apparatus 10 calculates similarities about the faces and clothes colors based on known similarity definitions such as cosine. For example, the information processing apparatus 10 calculates similarities about the faces and clothes colors among the images, as indicated in FIG. 6.

In FIG. 6, the similarity between the face in an image i and the face in an image j is denoted by $SIM_{i,j}$ (face), and the similarity between the clothes color in the image i and the clothes color in the image j is denoted by $SIM_{i,j}$ (color). For example, the similarity between the face of the image 1 and the face in the image Q is denoted by $SIM_{1,Q}$ (face), and this value is 0.95.

In the present specific example, the user specifies 0.8 as a face threshold $SIM_\tau$ (face), 0.6 as a clothes color threshold $SIM_\tau$ (color), and 3 as the number k of results.

The similarity score of a feature is defined by using a threshold about a specified feature as a weight and multiplying the specified feature by a similarity. The similarity score SIM of an image is defined by a sum of similarity scores of the individual specified features. For example, when the face and clothes color of the input image Q are specified, the similarity score of the image 1 is calculated as follows.

$$SIM_{1,Q} = SIM_\tau(\text{face}) * SIM_{1,Q}(\text{face}) + SIM_\tau(\text{color}) * SIM_{1,Q}(\text{color}) =$$
$$0.8 * 0.95 + 0.6 * 0.98 = 1.348$$

A representation power (RP) of a feature is defined by the reciprocal of the number of images whose similarity to the feature is equal to or more than a corresponding threshold. For example, since the number of images whose similarity to the face $face_1$ of the image 1 is equal to or more than the threshold is 3 (images 1, 2, 3), the representation power RP (face) of the face of the image 1 is ⅓.

The independence power (IP) (B; A) of a feature B with respect to a feature A is defined by the ratio of the images whose similarity to the feature B is equal to or less than a corresponding threshold among the images whose similarity to the feature A is equal to or more than a corresponding threshold. For example, among the three images (images 1, 2, and 4) whose similarity to the clothes color of the image 1 is equal to or more than the threshold, the number of images whose similarity to the face of the image 2 is equal to or less than the threshold is 1 (image 4). Thus, the independence power IP ($face_2$; $color_1$) of the face $face_2$ in the image 2 with respect to the clothes color colon of the image 1 is ⅓.

The independence power between features of the same kind is defined by a dissimilarity between images about the feature. For example, the independence power IP ($face_2$; $face_1$) of the face $face_2$ of the image 2 with respect to the face $face_1$ of the image 1 is defined as 1−0.92=0.08.

In addition, the independence power of a feature with respect to a plurality of kinds of features is defined by a multiplication of the independence powers of the individual features. For example, the independence power of the face-$face_2$ of the image 2 with respect to the face $face_1$ and the clothes color $color_1$ of the image 1 is defined as follows.

$$IP(face_2; face_1, color_1) =$$
$$IP(face_2; face_1) * IP(face_2; color_1) = 0.08 * 1/3 \approx 0.027$$

The independence power of a feature with respect to features of a plurality of images is defined by the minimum feature independence power with respect to the features of the individual images. For example, the independence power of the face $face_2$ of the image 2 with respect to the face $face_1$ and the clothe color $color_1$ of the image 1 and the face $face_3$ and the clothes color $color_3$ of the image 3 is defined as follows.

$$IP(face_2; face_1, color_1, face_3, color_3) =$$
$$\min\{IP(face_2; face_1, color_1), IP(face_2; face_3, color_3)\} =$$
$$\min\{0.08 * 1/3, 0.18 * 0/3\} = 0$$

The diversity score DIV of an image is defined as a sum (summation) of an aggregation of products of the similarity, the representation power, and the independence power of a specified individual feature and an aggregation of the representation power and the independence power of an individual feature not specified. Alternatively, similarity regarding the individual feature not specified may be set to 1, the diversity score DIV of the image may be defined as a sum of products of the similarity, the representation power, and the independence power of the individual feature.

For example, when a face is specified, the diversity score DIV (2; 1) of the image 2 with respect to the image 1 is expressed as follows:

$$DIV(2; 1) = SIM_{2,Q}(\text{face}) * RP(face_2) * IP(face_2; face_1, color_1) +$$
$$RP(color_2) * IP(color_2; face_1, color_1) =$$
$$0.9 * 1/3 * 0.08 * 1/3 + 1/3 * 1/3 * 0.02 \approx 0.01$$

Specific Example 1

In specific example 1, a face is specified.

Specific example 1 assumes that the user specifies a faceQ, which is the face in the input image Q, and 0.8, which is a face threshold $SIM_\tau$ (face), as the search conditions and that the information processing apparatus 10 outputs k results (k=3). In specific example 1, no clothes color about the input image Q is specified.

Figure 4:
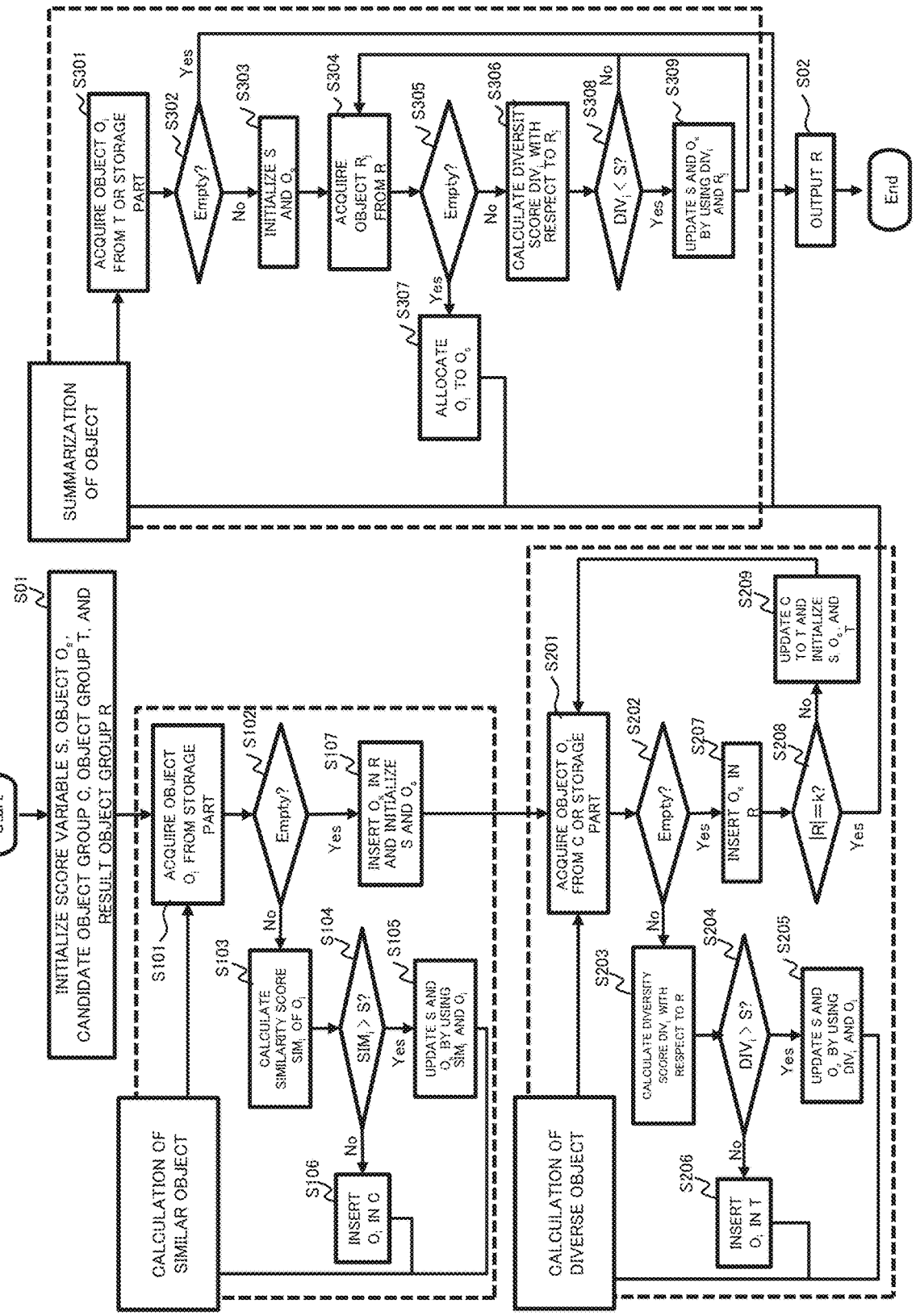
FIG. 4 is a flowchart illustrating details of diversification and summarization of search results.

First, as illustrated in the flowchart in FIG. 4, the similarity scores among the individual images are calculated, and a similar image indicating the maximum similarity score is selected.

The similarity scores are calculated as follows.

$$SIM_{1,Q} = SIM_\tau(\text{face}) * Sim_{1,Q}(\text{face}) = 0.8 * 0.95 = 0.76$$
$$SIM_{2,Q} = SIM_\tau(\text{face}) * Sim_{2,Q}(\text{face}) = 0.8 * 0.9 = 0.72$$
$$SIM_{3,Q} = Sim_\tau(\text{face}) * Sim_{3,Q}(\text{face}) = 0.8 * 0.8 = 0.64$$
$$SIM_{4,Q} = Sim_\tau(\text{face}) * Sim_{4,Q}(\text{face}) = 0.8 * 0.6 = 0.48$$

Thus, the image 1 is selected as the similar image.

Next, the diversity scores of the other images with respect to the image 1 are calculated, and a diverse image having the maximum diversity score is selected. The diversity scores are calculated as follows.

$$DIV(2; 1) = Sim_{2,Q}(\text{face}) * RP(face_2) * IP(face_2; face_1, color_1) +$$
$$RP(color_2) * IP(color_2; face_1, color_1) =$$
$$0.9 * 1/3 * 0.08 * 1/3 + 1/3 * 1/3 * 0.02 \approx 0.01$$
$$DIV(3; 1) = Sim_{3,Q}(\text{face}) * RP(face_3) * IP(face_3; face_1, color_1) +$$
$$RP(color_3) * IP(color_3; face_1, color_1) =$$
$$0.8 * 1/3 * 0.19 * 1/3 + 1/1 * 2/3 * 0.9 \approx 0.62$$
$$DIV(4; 1) = Sim_{4,Q}(\text{face}) * RP(face_4) * IP(face_4; face_1, color_1) +$$
$$RP(color_4) * IP(color_4; face_1, color_1) =$$
$$0.6 * 1/1 * 0.42 * 2/3 + 1/3 * 1/3 * 0.11 \approx 0.18$$

Thus, the image 3 is selected as the diverse image.

Next, the diversity scores of the other images with respect to the images 1 and 3 are calculated, and a diverse image having the maximum diversity score is selected. The diversity scores are calculated as follows.

$$DIV(2; 1, 3) =$$
$$Sim_{2,Q}(\text{face}) * RP(face_2) * IP(face_2; face_1, color_1, face_3, color_3) +$$
$$RP(color_2) * IP(color_2; face_1, color_1, face_3, color_3) =$$
$$0.9 * 1/3 * \min\{0.08 * 1/3, 0.18 * 0/3\} +$$
$$1/3 * \min\{1/3 * 0.02, 1/3 * 0.9\} \approx 0.02$$
$$DIV(4; 1, 3) = Sim_{4,Q}(\text{face}) * RP(face_4) * IP$$
$$(face_4; face_1, color_1, face_3, color_3) +$$
$$RP(color_4) * IP(color_4; face_1, color_1, face_3, color_3) =$$
$$0.6 * 1/1 * \min\{0.42 * 2/3, 0.5 * 1/1\} +$$
$$1/3 * \min\{1/3 * 0.11, 1/3 * 0.9\} \approx 0.18$$

Thus, the image 4 is selected as the diverse image.

The three result images are calculated as described above. Namely, the image 1, which is the similar image, and the images 3 and 4, which are the diverse images, are selected as the representative result images (result objects).

Finally, the diversity scores of the image 2 with respect to the result images 1, 3, and 4 are compared with each other, and the image 2 is summarized to a result image (a result object) having the minimum diversity score. The diversity scores are calculated as follows.

$$DIV(2; 3) = Sim_{2,Q}(\text{face}) * RP(face_2) * IP(face_2; face_3, color_3) +$$
$$RP(color_2) * IP(color_2; face_3, color_3) =$$
$$0.9 * 1/3 * 0.18 * 0/3 + 1/3 * 1/3 * 0.9 = 0.1 > DIV(2; 1)$$
$$DIV(2; 4) = Sim_{2,Q}(\text{face}) * RP(face_2) * IP(face_2; face_4, color_4) +$$
$$RP(color_2) * IP(color_2; face_4, color_4) =$$
$$0.9 * 1/3 * 0.44 * 1/3 + 1/3 * 1/1 * 0.1 \approx 0.08 > DIV(2; 1)$$

Thus, the image 2 is summarized to the result image 1.

Specific Example 2

In specific example 2, the user specifies a face and a clothes color.

Specific example 2 assumes that the user specifies a $face_Q$ and a $color_Q$, which are the face and the clothes color in the input image Q, and 0.8 and 0.6, which are a face threshold $SIM_\tau$ (face) and a clothes color threshold $SIM_\tau$ (color), as the search conditions and that the information processing apparatus 10 outputs k results (k=3).

First, as illustrated in the flowchart in FIG. 4, the similarity scores among the individual images are calculated.

The similarity scores are calculated as follows.

$$SIM_{1,Q} = Sim_\tau(\text{face}) * Sim_{1,Q}(\text{face}) + Sim_\tau(\text{color}) * Sim_{1,Q}(\text{color}) =$$
$$0.8 * 0.95 + 0.6 * 0.98 = 1.348$$
$$SIM_{2,Q} = Sim_\tau(\text{face}) * Sim_{2,Q}(\text{face}) + Sim_\tau(\text{color}) * Sim_{2,Q}(\text{color}) =$$
$$0.8 * 0.9 + 0.6 * 0.96 = 1.296$$

-continued $$SIM_{3,Q} = Sim_\tau(\text{face}) * Sim_{3,Q}(\text{face}) + Sim_\tau(\text{color}) * Sim_{3,Q}(\text{color}) =$$

$$0.8 * 0.8 + 0.6 * 0.1 = 0.7$$

$$SIM_{4,Q} = Sim_\tau(\text{face}) * Sim_{4,Q}(\text{face}) + Sim_\tau(\text{color}) * Sim_{4,Q}(\text{color}) =$$

$$0.8 * 0.6 + 0.6 * 0.9 = 1.02$$

Thus, the image 1 is selected as the similar image.

Next, the diversity scores of the other images with respect to the image 1 are calculated, and a diverse image having the maximum diversity score is selected. The diversity scores are calculated as follows.

$$DIV(2;1) = Sim_{2,Q}(\text{face}) * RP(face_2) * IP(face_2; face_1, color_1) +$$
$$Sim_{2,Q}(\text{color}) * RP(color_2) * IP(color_2; face_1, color_1) =$$
$$0.9 * 1/3 * 0.08 * 1/3 + 0.96 * 1/3 * 1/3 * 0.02 \approx 0.01$$

$$DIV(3;1) = Sim_{3,Q}(\text{face}) * RP(face_3) * IP(face_3; face_1, color_1) +$$
$$Sim_{3,Q}(\text{color}) * RP(color_3) * IP(color_3 face_1, color_1) =$$
$$0.8 * 1/3 * 0.19 * 1/3 + 0.1 * 1/1 * 2/3 * 0.9 \approx 0.08$$

$$DIV(4;1) = Sim_{4,Q}(\text{face}) * RP(face_4) * IP(face_4; face_1, color_1) +$$
$$Sim_{4,Q}(\text{color}) * RP(color_4) * IP(color_4; face_1, color_1) =$$
$$0.6 * 1/1 * 0.42 * 2/3 + 0.9 * 1/3 * 1/3 * 0.11 \approx 0.18$$

Thus, the image 4 is selected as the diverse image.

Next, the diversity scores of the other images with respect to the images 1 and 4 are calculated, and a diverse image having the maximum diversity score is selected. The diversity scores are calculated as follows.

$$DIV(2;1,4) =$$
$$Sim_{2,Q}(\text{face}) * RP(face_2) * IP(face_2; face_1, color_1, face_4, color_4) +$$
$$Sim_{2,Q}(\text{color}) * RP(color_2) * IP(color_2; face_1, color_1, face_4, color_4) =$$
$$0.9 * 1/3 * \min\{0.08 * 1/3, 0.44 * 1/3\} +$$
$$0.96 * 1/3 * \min\{1/3 * 0.02, 1/1 * 0.9\} \approx 0.01$$

$$DIV(3;1,4) = Sim_{3,Q}(\text{face}) * RP(face_3) *$$
$$IP(face_3; face_1, color_1, face_4, color_4) + Sim_{3,Q}(\text{color}) *$$
$$RP(color_3) * IP(color_3; face_1, color_1, face_4, color_4) =$$
$$0.8 * 1/3 * \min\{0.19 * 1/3, 0.5 * 1/3\} +$$
$$0.1 * 1.1 * \min\{2/3 * 0.9, 1/1 * 0.9\} \approx 0.08$$

Thus, the image 3 is selected as the diverse image.

The three result images are calculated as described above.

Finally, the diversity scores of the image 2 with respect to the result image 1, 4, and 3 are compared with each other, and the image 2 is summarized to a result image having the minimum diversity score. The diversity scores are calculated as follows.

$$DIV(2;3) = Sim_{2,Q}(\text{face}) * RP(face_2) * IP(face_2; face_3, color_3) +$$
$$Sim_{2,Q}(\text{color}) * RP(color_2) * IP(color_2; face_3 color_3) =$$
$$0.9 * 1/3 * 0.18 * 0/3 + 0.96 * 1/3 * 1/3 * 0.9 = 0.096 > DIV(2;1)$$

$$DIV(2;4) = Sim_{2,Q}(\text{face}) * RP(face_2) * IP(face_2; face_4, color_4) +$$
$$Sim_{2,Q}(\text{color}) * RP(color_2) * IP(color_2; face_4, color_4) =$$
$$0.9 * 1/3 * 0.44 * 1/3 + 0.96 * 1/3 * 1/1 * 0.1 = 0.076 > DIV(2;1)$$

Thus, the image 2 is summarized to the result image 1.

Hardware Configuration

Next, a hardware configuration of the information processing apparatus 10 according to the first exemplary embodiment will be described.

Figure 7:
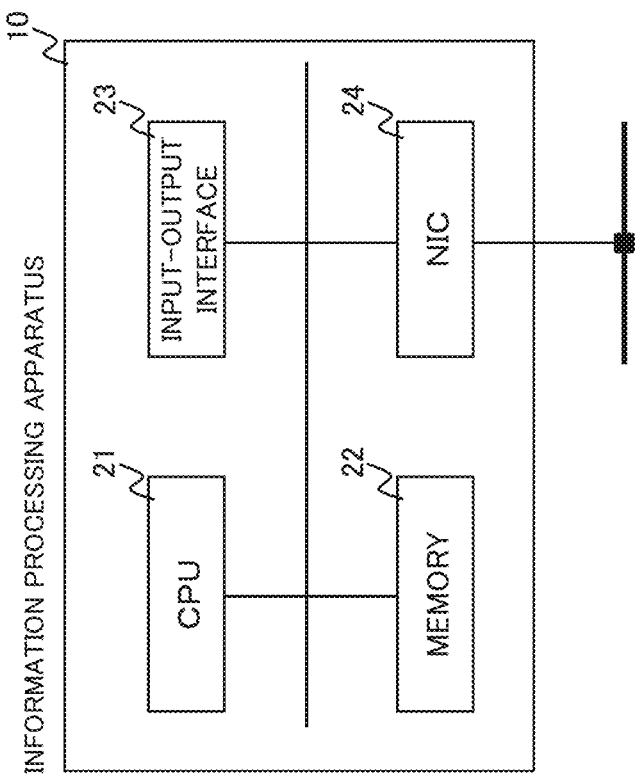
FIG. 7 is a block diagram illustrating an example of a hardware configuration of the information processing apparatus according to the first exemplary embodiment.

FIG. 7 is a block diagram illustrating an example of a hardware configuration of the information processing apparatus 10 according to the first exemplary embodiment. The information processing apparatus 10 is a so-called computer and has a configuration as illustrated in FIG. 7. For example, the information processing apparatus 10 includes a central processing unit (CPU) 21, a memory 22, an input-output interface 23, and a network interface card (NIC) 24 serving as communication means, which are connected to each other via an internal bus.

The hardware configuration of the information processing apparatus 10 is not limited to that illustrated in FIG. 7. The information processing apparatus 10 may include hardware not illustrated. The number of CPUs, etc. included in the information processing apparatus 10 is not limited to the example illustrated in FIG. 7. For example, a plurality of CPUs may be included in the information processing apparatus 10.

The memory 22 is a random access memory (RAM), a read-only memory (ROM), or an auxiliary storage device (a hard disk, etc.).

The input-output interface 23 is means serving as an interface connected to a display apparatus or an input apparatus not illustrated. The display apparatus is, for example, a liquid crystal display or the like. The input apparatus is, for example, an apparatus that receives user operations, such as a keyboard or a mouse.

The individual kinds of functions (the above processing modules) of the information processing apparatus 10 according to the first exemplary embodiment are realized by, for example, causing the CPU 21 to execute a program stored in the memory 22. In addition, this program can be updated by downloading an updated program via a network or by using a storage medium holding an updated program. The above processing modules may be realized by a semiconductor chip. Namely, any means of executing the functions of the processing modules by using hardware and/or software may be used.

All the constituent elements of the information processing apparatus 10 may be implemented by a single client computer or a single server computer. Alternatively, the constituent elements of the information processing apparatus 10 may be implemented on a plurality of clients or servers. At least a part of the elements may be implemented on a client, and the other elements may be implemented on a server. For example, the search result diversification section 202 of the search processing part 16 may be implemented on a single server, the search result summarization section 203 may be implemented on another server, and the result presentation part 17 may be implemented on a client. Alternatively, the search processing part 16 may be implemented on a server, and the result presentation part 17 may be implemented on a client. In this way, the exemplary embodiment disclosed in the present application is applicable to various computer environments.

Figure 8:
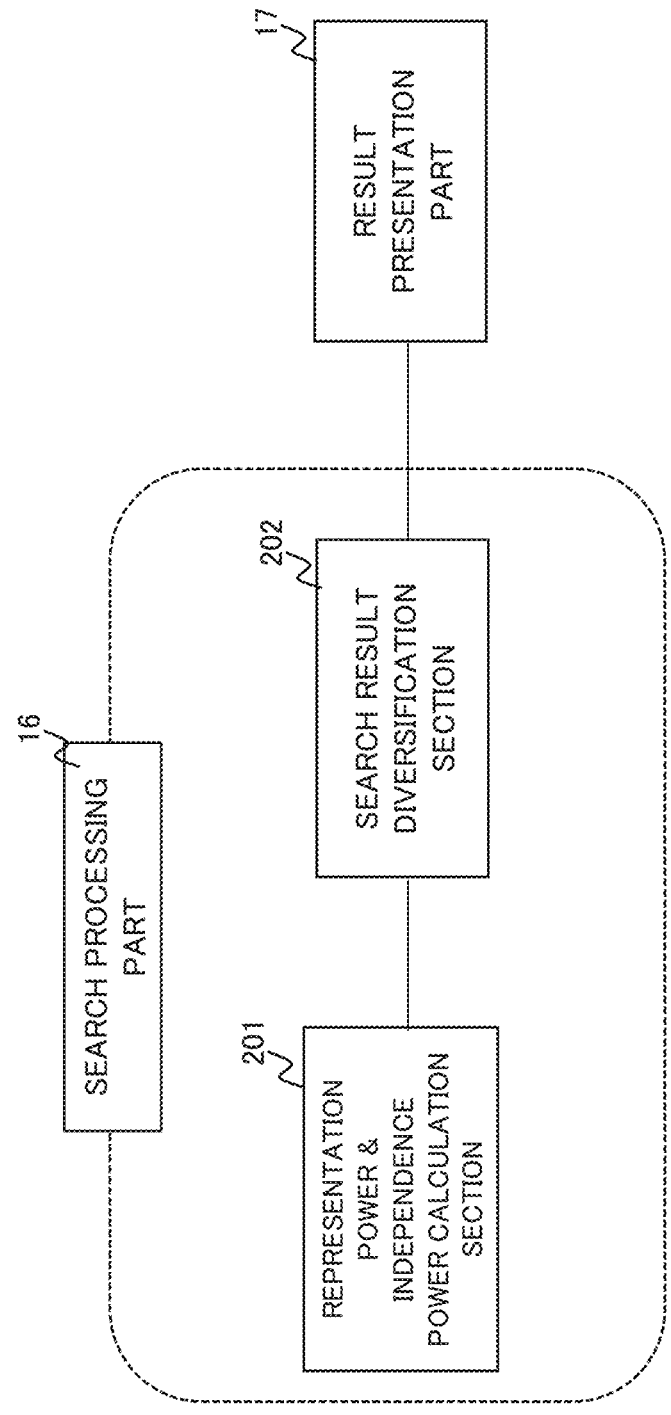
FIG. 8 illustrates another example of the internal configuration of the search processing part.

The configurations and operations of the information processing apparatus 10 according to the above exemplary embodiment are only examples. Thus, various modification can be made. For example, as illustrated in FIG. 8, the search result summarization part may be omitted. Namely, the search processing part 16 may calculate the representation powers and independence powers and diversify a search result(s), and the result presentation part may display a diverse representative result(s).

In addition, the embodiment(s) disclosed in the present application can be combined without causing any contradiction in the contents. Namely, the processing module configurations and implementation formats thereof in FIGS. 3 and 8 can be combined in various ways.

In addition, while a plurality of steps (processing) are sequentially listed in the plurality of flowcharts described above, the order of the steps performed in the above exemplary embodiment(s) is not limited to the order described above. In the exemplary embodiment(s), for example, individual processing may be performed in parallel. Namely, the order of the steps illustrated may be changed as long as the change does not cause a problem.

As described above, according to the first exemplary embodiment, the representation powers and the independence powers of the individual features are defined. The information processing apparatus 10 performs diversification and summarization of a search result(s), based on not only the similarity scores of the feature(s) specified by a search condition(s) but also the diversity scores defined based on the representation powers and the independence powers of the features. As a result, when a representative result(s) is selected, duplicate or similar results are summarized. In addition, by additionally considering the representation power(s) and the independence power(s) of a feature(s) not specified, a search condition(s) can flexibly be handled, and the labor needed by the user to adjust the search condition(s) can be reduced. In addition, when presenting a search result(s) to the user, the result presentation part 17 presents a search result(s) in a visually plain and simple manner. Thus, the time needed by the user to check the search results or acquire desired information from the search results can be reduced. In addition, when there is no search condition about any feature, the information processing apparatus 10 can perform clustering on data groups in view of all the features.

While the industrial applicability of the present invention is apparent from the above description, for example, the present invention is suitably applicable to information search on multimedia data including a plurality of kinds of information such as text, audio, time, location, pixel, and attribute information. The present invention is also suitably applicable to clustering on multimedia data.

The above exemplary embodiment(s) may entirely or partially be described, but not limited to, as follows.

Note 1

See the information processing apparatus according to the above first aspect.

Note 2

The information processing apparatus according to note 1; wherein the search processing part determines a depending object(s) depended to the representative result object(s) from the plurality of objects; and
wherein the result presentation part presents the representative result object(s) and the depending object(s) to the user in a manner in which the representative result object(s) and the depending object(s) are visually distinguishable.

Note 3

The information processing apparatus according to note 1 or 2;
wherein the search processing part outputs a feature(s), which is the second feature(s) not specified by the search condition(s) and has been used for the selection of the representative result object(s), to the result presentation part; and
wherein the result presentation part presents the outputted second feature(s) to the user.

Note 4

The information processing apparatus according to any one of notes 1 to 3; wherein, when no feature(s) is specified as the search condition(s) by the user, the search processing part selects the representative result object(s) based on the plurality of features.

Note 5

The information processing apparatus according to any one of notes 2 to 4; wherein the search processing part calculates a similarity score indicating a similarity about the search condition(s) for an individual one of the plurality of objects, selects a similar object(s) similar to a search target object specified by the search condition(s) from the plurality of objects based on the similarity scores, calculates a diversity score indicating a dissimilarity of an individual object other than the similar object(s) among the plurality of objects with respect to the similar object(s), and selects the representative result object(s) based on the diversity score(s).

Note 6

The information processing apparatus according to note 5; wherein the search processing part calculates, for an individual one of the plurality of features, a representation power indicating an importance of an individual feature and an independence power indicating that a certain feature cannot be estimated from another feature based on a correlation between the features and calculates the diversity score of an individual feature based on the representation power, the independence power, and the similarity score of the individual feature.

Note 7

The information processing apparatus according to note 5 or 6; wherein the search processing part selects the representative result object(s) based on the diversity scores based on the extracted features.

Note 8

The information processing apparatus according to any one of notes 5 to 7; wherein the search processing part selects the depending object(s) based on the diversity score(s) of another (other) object(s) with respect to the representative result object(s).

Note 9

The information processing apparatus according to any one of notes 1 to 8; wherein the object(s) is image data or moving image data.

Note 10

See the information processing apparatus according to the above second aspect.

Note 11

See the information processing method according to the above third aspect.

Note 12

See the program according to the above fourth aspect.

The disclosure of each of the above PTLs, etc. that have been referred to is incorporated herein by reference thereto. Variations and adjustments of the exemplary embodiment(s) and examples are possible within the scope of the overall disclosure (including the claims) of the present invention and based on the basic technical concept of the present invention. Various combinations and selections of various disclosed elements (including the elements in the claims, exemplary embodiment(s), examples, drawings, etc.) are possible within the scope of the entire disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST 10, 100 information processing apparatus
11 data acquisition part
12 feature extraction part
13 storage part
14 search reception part
15 search conversion part
16, 101 search processing part
17, 102 result presentation part
21 CPU (Central Processing Unit)
22 memory
23 input-output interface
24 NIC (Network Interface Card)
201 representation power and independence power calculation section
202 search result diversification section
203 search result summarization part

What is claimed is:

1. An information processing apparatus, comprising:
   at least one data acquisition part for acquiring a plurality of objects;
   at least one search reception part for receiving a search condition from a user;
   at least one memory configured to store instructions and the plurality of objects; and
   at least one processor configured to execute the instructions, to perform:
   calculating a similarity score indicating a similarity with respect to the search condition for individual one of the plurality of objects;
   selecting a similar object from the plurality of objects based on the similarity scores, the similar object being similar to a search target object specified by the search condition;
   calculating a diversity score indicating a dissimilarity of an individual object other than the similar object, among the plurality of objects with respect to the similar object;
   selecting a representative result object, from the plurality of objects based on the similarity score and the diversity score; and
   presenting the representative result object to the user;
   the instructions further comprising:
   calculating, for an individual one of the plurality of features, a representation power indicating an importance of an individual feature and an independence power indicating that a certain feature cannot be estimated from another feature based on a correlation between the features; and
   calculating the diversity score of an individual feature based on the representation power, the independence power, and the similarity score of the individual feature.

2. The information processing apparatus according to claim 1, the instruction further comprising:
   determining a depending object depended on the representative result object from the plurality of objects; and
   presenting the representative result object and the depending object to the user in a manner in which the representative result object and the depending object are visually distinguishable.

3. The information processing apparatus according to claim 1, the instruction further comprising:
   outputting a feature, which is the second feature not specified by the search condition and has been used for the selection of the representative result object, to the result presentation part; and
   wherein the result presentation part presents the outputted second feature to the user.

4. The information processing apparatus according to claim 1, the instruction further comprising:
   selecting the representative result object based on the plurality of features when no feature is specified as the search condition by the user.

5. The information processing apparatus according to claim 1, the instruction further comprising:
   selecting the representative result object based on the diversity scores based on the extracted features.

6. An information processing apparatus, comprising:
   at least one data acquisition part for acquiring a plurality of objects;
   at least one search reception part for receiving a search condition from a user;
   at least one memory configured to store instructions and the plurality of objects; and at least one processor configured to execute the instructions, to perform:

calculating a representation power indicating an importance of an individual feature extracted from an individual one of the plurality of objects;

calculating an independence power indicating that a certain feature cannot be estimated from another feature based on a correlation between the features;

calculating a similarity score of an individual one of the plurality of object based on a search condition from a user, the similarity score being indicating how much the object matches the search condition;

calculating a diversity score indicating a difference from another object among the plurality of objects based on the representation power, the independence power, and the similarity score of the individual object; and selecting a representative result from the plurality of objects based on the diversity scores;

the instructions further comprising:

calculating, for an individual one of the plurality of features, a representation power indicating an importance of an individual feature and an independence power indicating that a certain feature cannot be estimated from another feature based on a correlation between the features; and calculating the diversity score of an individual feature based on the representation power, the independence power, and the similarity score of the individual feature.

7. An information processing method executed by an apparatus that comprises at least one data acquisition part for acquiring a plurality of objects and at least one search reception part for receiving a search condition from a user, comprising:

calculating a similarity score indicating a similarity with respect to the search condition for an individual one of the plurality of objects;

selecting a similar object from the plurality of objects based on the similarity scores, the similar object being similar to a search target object specified by the search condition;

calculating a diversity score indicating a dissimilarity of an individual object other than the similar object, among the plurality of objects with respect to the similar object;

selecting a representative result object, from the plurality of objects based on the similarity score and the diversity score; and presenting the representative result object to the user;

the method further comprising:

calculating, for an individual one of the plurality of features, a representation power indicating an importance of an individual feature and an independence power indicating that a certain feature cannot be estimated from another feature based on a correlation between the features; and calculating the diversity score of an individual feature based on the representation power, the independence power, and the similarity score of the individual feature.

8. The information processing method according to claim 7, further comprising:

determining a depending object depended on the representative result object from the plurality of objects; and presenting the representative result object and the depending object to the user in a manner in which the representative result object and the depending object are visually distinguishable.

9. The information processing method according to claim 7, further comprising:

outputting a feature, which is the second feature not specified by the search condition and has been used for the selection of the representative result object, to the result presentation part; and presenting the outputted second feature to the user.

10. The information processing method according to claim 7, further comprising:

selecting the representative result object based on the plurality of features, when no feature is specified as the search condition by the user.

11. The information processing method according to claim 7, further comprising:

calculating, for an individual one of the plurality of features, a representation power indicating an importance of an individual feature and an independence power indicating that a certain feature cannot be estimated from another feature based on a correlation between the features and calculating the diversity score of an individual feature based on the representation power, the independence power, and the similarity score of the individual feature.

* * * * *